(12) United States Patent
Mason et al.

(10) Patent No.: US 7,391,382 B1
(45) Date of Patent: Jun. 24, 2008

(54) TRANSMIT/RECEIVE MODULE AND METHOD OF FORMING SAME

(75) Inventors: James S. Mason, Richardson, TX (US);
Timothy C. Fletcher, Garland, TX (US);
Matthew D. Brown, Allen, TX (US);
Thomas Taylor, Richardson, TX (US)

(73) Assignee: Raytheon Company, Waltham, MA (US)

( * ) Notice: Subject to any disclaimer, the term of this patent is extended or adjusted under 35 U.S.C. 154(b) by 34 days.

(21) Appl. No.: 11/101,686

(22) Filed: Apr. 8, 2005

(51) Int. Cl.
*H01Q 19/06* (2006.01)
(52) U.S. Cl. .................................................. 343/754
(58) Field of Classification Search ............... 343/754, 343/700 MS, 746, 766–767, 770, 785, 911 R; 257/500, 672, 921–923
See application file for complete search history.

(56) References Cited

U.S. PATENT DOCUMENTS

| | | | |
|---|---|---|---|
| 4,939,527 A | 7/1990 | Lamberty et al. | 343/771 |
| 4,987,425 A | 1/1991 | Zahn et al. | 343/853 |
| 5,128,689 A | 7/1992 | Wong et al. | 343/853 |
| 5,206,712 A | 4/1993 | Kornrumpf et al. | 361/393 |
| 5,245,745 A * | 9/1993 | Jensen et al. | 29/600 |
| 5,327,150 A | 7/1994 | Cherrette | 343/771 |
| 5,426,442 A | 6/1995 | Haas | 343/778 |
| 5,465,859 A | 11/1995 | Chapple-Sokol et al. | 216/12 |
| 5,666,128 A | 9/1997 | Murray et al. | 343/878 |
| 5,745,082 A * | 4/1998 | Alder | 343/753 |
| 5,776,275 A * | 7/1998 | Krishnamurthy et al. | 156/150 |
| 5,940,031 A | 8/1999 | Turlington et al. | 342/372 |
| 6,114,986 A * | 9/2000 | Cassen et al. | 342/175 |
| 6,184,828 B1 | 2/2001 | Shoki | 342/372 |
| 6,366,259 B1 | 4/2002 | Pruett et al. | 343/853 |
| 6,377,217 B1 * | 4/2002 | Zhu et al. | 343/700 MS |
| 6,388,623 B1 * | 5/2002 | Sakota et al. | 343/700 MS |
| 6,514,296 B1 * | 2/2003 | Tsai et al. | 29/25.03 |
| 6,580,402 B2 * | 6/2003 | Navarro et al. | 343/853 |
| 6,611,230 B2 * | 8/2003 | Phelan | 342/373 |
| 6,768,458 B1 * | 7/2004 | Green et al. | 342/375 |
| 6,903,931 B2 | 6/2005 | McCordic et al. | 361/711 |
| 2004/0056346 A1 | 3/2004 | Palm et al. | 257/706 |
| 2004/0239571 A1 * | 12/2004 | Papziner et al. | 343/713 |
| 2004/0262645 A1 * | 12/2004 | Huff et al. | 257/232 |
| 2005/0023558 A1 * | 2/2005 | Shi | 257/200 |

OTHER PUBLICATIONS

Mason, et al.; U.S. Appl. No. 11/101,702; *Subassembly for an Active Electronically Scanned Array*, filed Apr. 8, 2005.
Mason, et al.; U.S. Appl. No. 11/101,703; *Integrated Subarray Structure*.

* cited by examiner

*Primary Examiner*—Huedung Mancuso
(74) *Attorney, Agent, or Firm*—Baker Botts L.L.P.

(57) ABSTRACT

According to an embodiment of the present invention, a transmit/receive module for a phased array radar includes a substrate, a ground plane formed outwardly from the substrate, and one or more dielectric layers formed outwardly from the ground plane. The one or more dielectric layers have RF and DC routing formed therein. The transmit/receive module further includes an electronic device coupled outwardly from the one or more dielectric layers, and a lid coupled to a portion of the one or more dielectric layers.

20 Claims, 3 Drawing Sheets

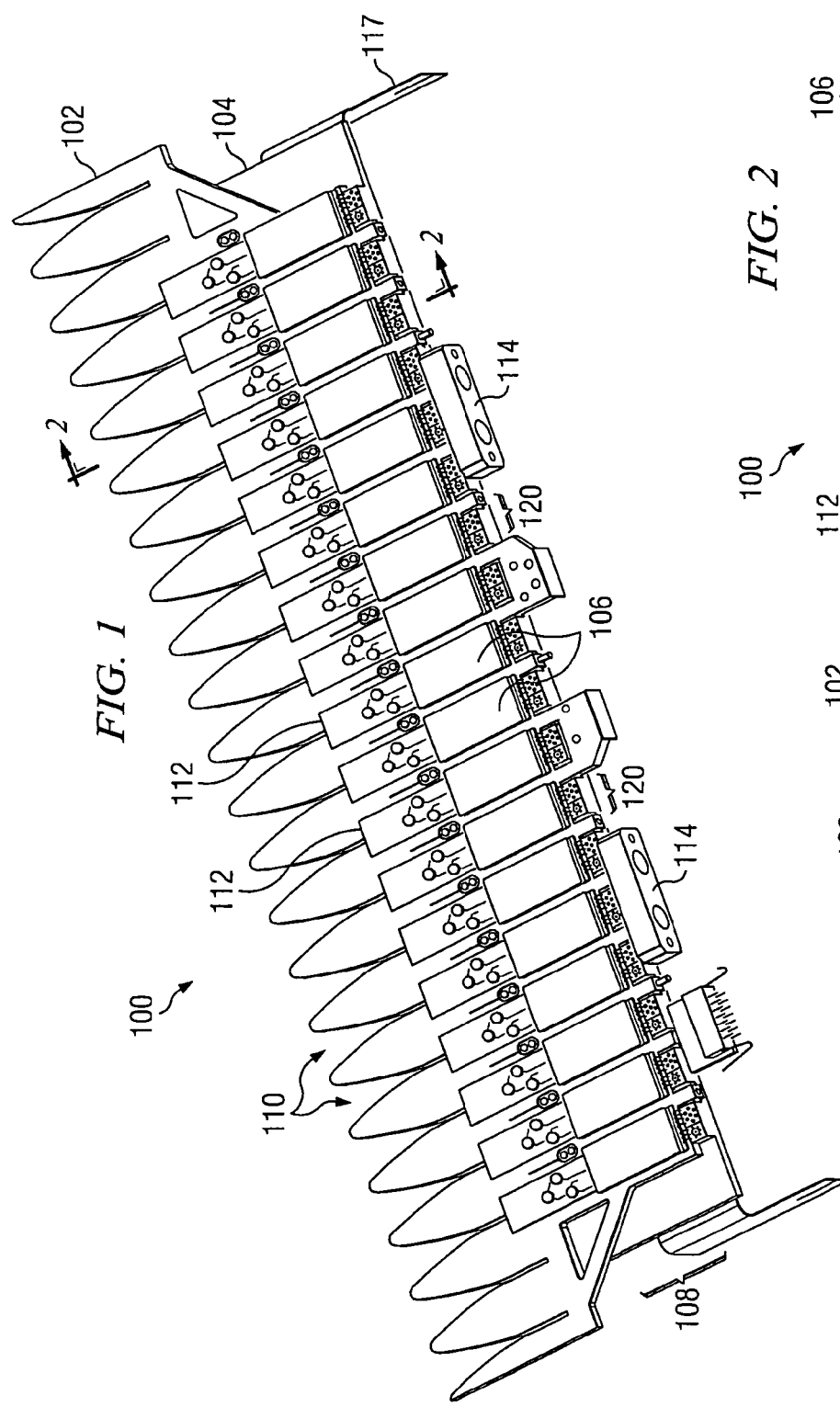
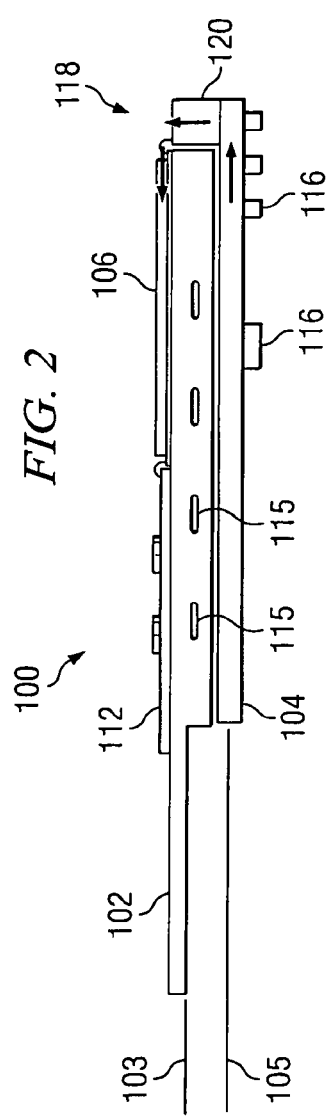
FIG. 1
FIG. 2

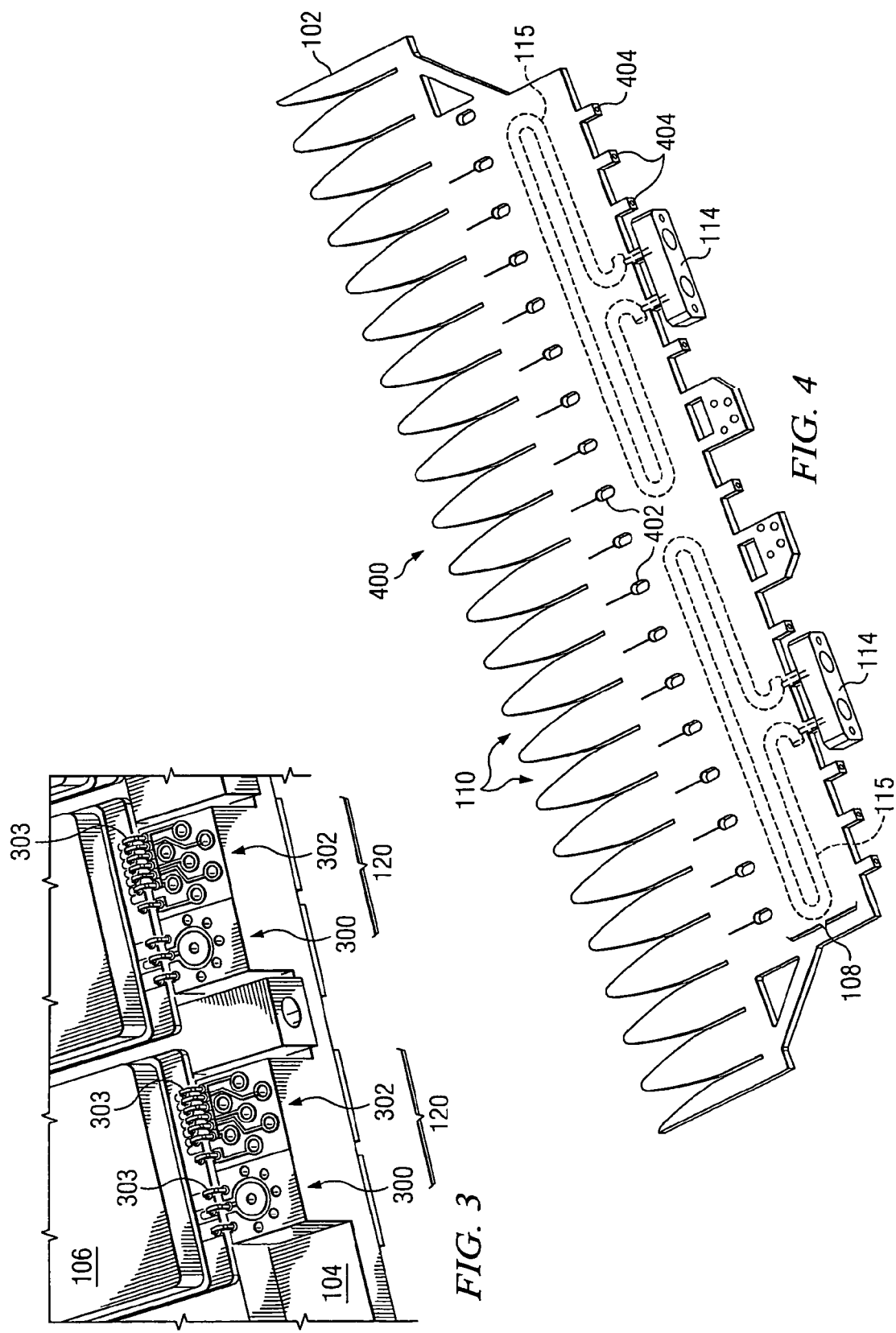

US 7,391,382 B1

TRANSMIT/RECEIVE MODULE AND METHOD OF FORMING SAME

TECHNICAL FIELD OF THE INVENTION

This invention relates in general to phased arrays and, more particularly, to a low-cost, transmit/receive module and method of forming same.

BACKGROUND OF THE INVENTION

During recent decades, antenna technology has experienced an increase in the use of antennas that utilize an array of antenna elements, one example of which is a phased array antenna, such as an active electronically scanned array. Antennas of this type have many applications in commercial and defense markets, such as communications and radar systems. In many of these applications, especially for radar systems used in aircraft, light weight and compactness are important.

Attempts to achieve lightweight antennas have sometimes used a "tile" approach where the various functions required for the array are implemented in a multilayer circuit board, which also contains layers for the transmit/receive modules and antenna radiators. However, this results in a highly complex and costly phased array antenna.

SUMMARY OF THE INVENTION

According to an embodiment of the present invention, a transmit/receive module for a phased array radar includes a substrate, a ground plane formed outwardly from the substrate, and one or more dielectric layers formed outwardly from the ground plane. The one or more dielectric layers have RF and DC routing formed therein. The transmit/receive module further includes an electronic device coupled outwardly from the one or more dielectric layers, and a lid coupled to a portion of the one or more dielectric layers.

Embodiments of the invention provide a number of technical advantages. Embodiments of the invention may include all, some, or none of these advantages. For example, in one embodiment, the packaging density of a tile array is realized, but in a slat format. Utilizing a unique 3D slat configuration facilitates a light weight and compact AESA that maximizes use of volumetric space. Array level producibility is also enhanced to produce not only a low-weight and compact array, but a low-cost one. In one embodiment, RF signals received by a transmit/receive module do not have to travel through vias in a substrate into the RF paths or traces formed in a thick film circuit. The RF signals merely travel under a seal ring into RF traces formed in the thick film circuit. This still allows transmit/receive module to obtain good RF impedance.

Other technical advantages are readily apparent to one skilled in the art from the following figures, descriptions, and claims.

BRIEF DESCRIPTION OF THE DRAWINGS

FIG. 1 is a perspective view of a subassembly for a phased array radar according to one embodiment of the present invention;

FIG. 2 is a cross-section of the subassembly of FIG. 1;

FIG. 3 is a perspective view of a portion of the subassembly of FIG. 1;

FIG. 4 is a perspective view of a multi-function carrier structure for a phased array radar according to one embodiment of the present invention;

DETAILED DESCRIPTION OF THE INVENTION

Figure 5A:
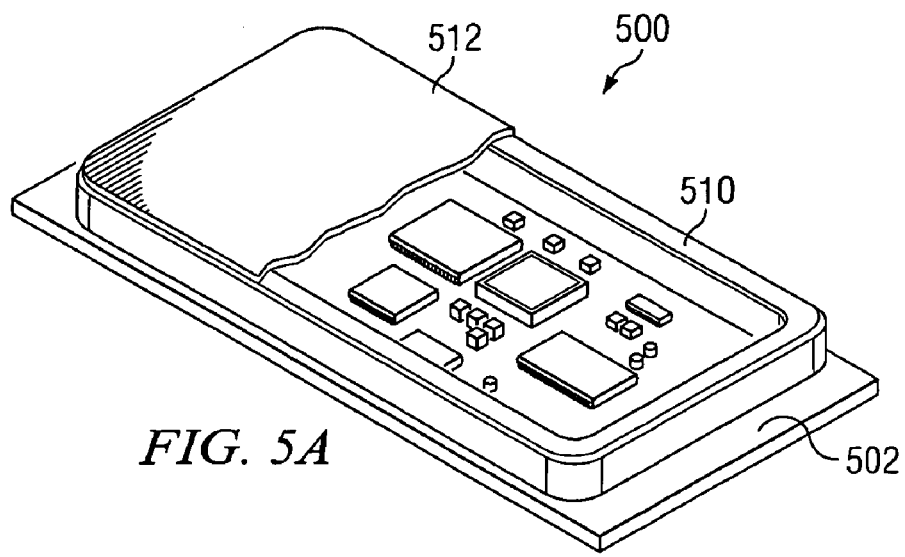
FIG. 5A is a perspective view of a transmit/receive module for a phased array radar according to one embodiment of the present invention.

Embodiments of the present invention and some of their advantages are best understood by referring to FIGS. 1 through 5B of the drawings, like numerals being used for like and corresponding parts of the various drawings.

FIG. 1 is a perspective view, and FIG. 2 is a cross-section, of a subassembly 100 for a phased array radar according to one embodiment of the present invention. Subassembly 100 may be useful in any suitable phased array radar, such as an active electronically scanned array ("AESA"), and may be particularly useful for arrays in a "slat" or "brick" type format. In some embodiments, subassembly 100 and components thereof maximize the use of volumetric space within an array, reduce array depth, and significantly reduce the weight of an array.

In the illustrated embodiment, subassembly 100 includes a substrate 102 generally lying in a first plane 103 and a multi-function board 104 generally lying in a second plane 105 that is parallel to first plane 103. Thus, substrate 102 and multi-function board 104 are in spaced apart relation to one another and form a stacked configuration to facilitate, among other things, efficient packaging density for a brick type array that is comparable to a tile array.

Substrate 102, in one embodiment, includes a plurality of transmit/receive modules 106 coupled to a mounting surface 108, a plurality of radiating elements 110 formed adjacent mounting surface 108, a plurality of circulator/radiator feed networks 112 adjacent the transmit/receive modules 106, and a pair of coolant interfaces 114 coupled to a pair of cooling channels 115 formed within a thickness of substrate 102. However, the present invention contemplates substrate 102 having more, fewer, or different components than those illustrated in FIGS. 1 and 2.

Transmit/receive modules 106 may be any suitable electronic devices that function to aid in the transmission and/or receiving of radio frequency ("RF") signals to and from subassembly 100 in conjunction with other components associated with subassembly 100, such as circulator/radiator feed networks 112 and radiating elements 110. In one embodiment, transmit/receive modules 106 include monolithic microwave integrated circuits ("MMICs"); however, other suitable integrated circuits may be associated with transmit/receive modules 106. For example, transmit/receive modules 106 may be multi-channel transmit/receive modules. An example transmit/receive module is shown and described below in conjunction with FIGS. 5A and 5B.

Transmit/receive modules 106 may couple to mounting surface 108 in any suitable manner, such as adhesive bonding. In addition, transmit/receive modules 106 may couple to circulator/radiator feed networks 112 in any suitable manner, such as wire bonding or other suitable interconnects. Circulator/radiator feed networks 112 may be any suitable circulator/radiator feed networks and may couple to substrate 102 in any suitable manner. For example, each circulator/radiator feed network 112 may include a five port circulator and a hard substrate radiator feed network. In addition, radiating elements 110 may also be any suitable type, such as the wideband notch radiators shown.

To help control temperature gradients within substrate 102 caused by heat generated by transmit/receive modules 106, a coolant (not explicitly illustrated) is circulated underneath the transmit/receive modules 106 via cooling channels 115, which are shown and described in more detail below in conjunction with FIG. 4. In order to circulate a coolant therethrough, coolant interfaces 114 include entries and exits for the coolant, which may be any suitable coolant.

Multi-function board 104 may be any suitable printed circuit board formed from any suitable material that includes any suitable electronic devices, such as energy storage capacitors and drain voltage regulators, to route suitable signals there through. In one embodiment, multi-function board 104 includes RF manifolding (e.g., signal combining) and power distribution functions for the transmit/receive modules 106. Multi-function board 104 may also include a DC logic function for signal distribution control via transmit/receive modules 106. Also illustrated in FIG. 1 is a power interface 117 coupled to or associated with multi-function board 104 in order to get power into multi-function board 104.

According to the teachings of one embodiment of the invention, as illustrated best by FIG. 2, multi-function board 104 is "folded" underneath substrate 102 to reduce array depth and weight through improved volumetric packaging efficiency. This folded arrangement forms a stacked configuration such that RF signals destined for the transmit/receive modules 106 make a 180 degree transition when traveling from multi-function board 104 into transmit/receive modules 106. This is indicated by the arrows 118 in FIG. 2. The 180 degree transition may be accomplished in any suitable manner, such as by the RF signals making two 90 degree transitions, one in multi-function board 104 and one in the interconnect from multi-function board 104 to transmit/receive modules 106.

Any suitable components may facilitate this transition, such as one or more posts 120 associated with multi-function board 104. Among other potential advantages, posts 120 may control impedance of the RF signals. Posts 120 are shown and described in greater detail below in conjunction with FIG. 3.

As illustrated in FIG. 3, posts 120 include an RF feed portion 300 and a DC feed portion 302, which may be integral with one another or may be separate components. Posts 120 may couple to multi-function board 104 in any suitable manner and, in some embodiments, may be formed integral with multi-function board 104 during the manufacturing process. Both RF feed portion 300 and DC feed portion 302 may have any suitable configuration. In the illustrated embodiment, both RF feed portion 300 and DC feed portion 302 have any suitable number and configuration of traces and plated-through vias to facilitate the transmission of signals from multi-function board 104 into transmit/receive modules 106, or vice versa. Any suitable connection method may be utilized to transfer the signals from posts 120 to transmit/receive modules 106, such as the wire bonds 303 illustrated or other suitable interconnects.

FIG. 4 is a perspective view of a multi-function carrier structure 400 for a phased array radar according to one embodiment of the present invention. In the illustrated embodiment, multi-function carrier structure 400 includes substrate 102 having mounting surface 108 for transmit/receive modules 106, radiating elements 110 integrally formed in the substrate 102 adjacent mounting surface 108, and cooling channels 115 integrally formed within a thickness of substrate 102. Substrate 102 may also include apertures 402 and protrusions 404 formed therein.

Substrate 102 may be formed from any suitable material; however, in one embodiment, substrate 102 is formed from a material having a coefficient of thermal expansion similar to respective substrates of transmit/receive modules 106. In another embodiment, substrate 102 is formed from a material having a coefficient of thermal expansion similar to multi-function board 104. In one embodiment of the invention, substrate 102 is formed from Aluminum Silicon Carbide ("AlSiC"). In other embodiments, substrate 102 is formed from copper, stainless steel, or other suitable materials. Substrate 102 may also be formed from a material having any suitable density. In a particular embodiment of the invention, substrate 102 has a density less than or equal to three grams per cubic centimeter.

As illustrated in FIG. 4, cooling channels 115 are located substantially beneath mounting surface 108 at a location where transmit/receive modules are mounted. Cooling channels 115 may have any suitable routing and may be any suitable size, which may be determined using any suitable method, such as computer-aided design software. In one embodiment, cooling channels are configured to facilitate a less than four degrees C. temperature gradient under transmit-receive modules 106.

Apertures 402 may have any suitable size and shape and function to allow transmit/receive modules 106 and/or circulator/radiator feed networks 112 to electrically couple to one or more components of multi-function board 104 beneath substrate 102. As an example, apertures 402 may be used to facilitate the drain voltage for subassembly 100.

Protrusions 404 may also be integrally formed with substrate 102 and some of the protrusions 404 may have internal threads therein that function to allow substrate 102 to couple to a mounting chassis (not illustrated) of a phased array radar for ease of construction and/or maintenance. Some protrusions 404 may be utilized for alignment purposes.

Figure 5B:
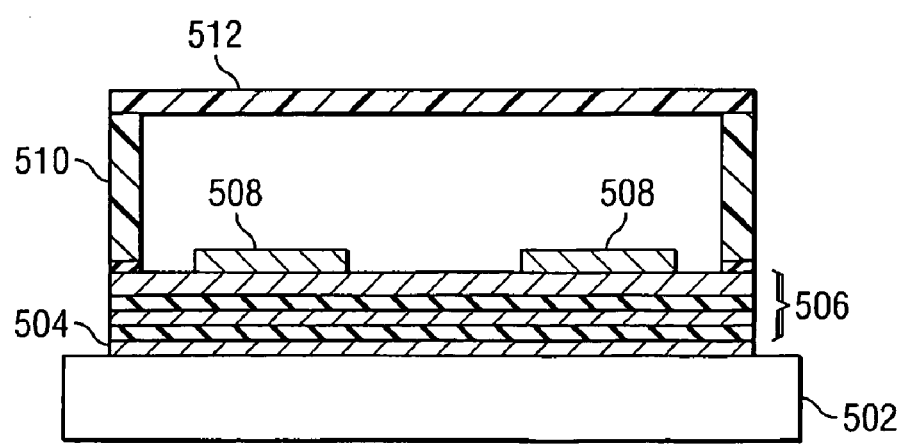
FIG. 5B is a cross-section of the transmit/receive module of FIG. 5A.

FIG. 5A is a perspective view, and FIG. 5B is a cross-section of, a transmit/receive module 500 for a phased array radar according to one embodiment of the present invention. In one embodiment, transmit-receive module 500 is similar to transmit-receive module 106 as shown above. Transmit/receive module 500 may be a single channel transmit/receive module or a multi-channel transmit/receive module having any suitable number of channels.

In the illustrated embodiment, transmit/receive module 500 includes a substrate 502, a ground plane 504 formed outwardly from substrate 102, a thick film circuit 506 formed outwardly from ground plane 504, one or more electronic devices 508 coupled to the top layer of thick film circuit 506, a seal ring 510 coupled to at least a portion of the top layer of thick film circuit 506, and a lid 512 coupled to seal ring 510. However, the present invention contemplates more, fewer, or different components than those illustrated in FIGS. 5A and 5B. For example, seal ring 510 may be eliminated in some embodiments in which a bathtub type lid is utilized, as described further below.

Substrate 502 may be formed from any suitable material; however, in one embodiment, substrate 502 is formed from a ceramic. In a particular embodiment of the invention, substrate 502 may be formed from beryllium oxide ("BeO"). Substrate 502 may also have any suitable thickness; however, in one embodiment, substrate 502 has a thickness of approximately 25 mils. According to the teachings of a particular embodiment of the invention, substrate 502 has no vias formed therein, which is believed to be different from prior transmit-receive modules.

Ground plane 504 is formed on a top side 503 of substrate 502 and may be formed from any suitable material having any suitable thickness. Thick film circuit 506 is formed outwardly from ground plane 504 and includes a plurality of dielectric layers having any suitable RF and DC routing formed therein. Thick film circuit 506 may also have suitable logic routing formed therein. Any suitable dielectric material may be used to form the dielectric layers within thick film circuit 506 and any suitable metal may also be used to form the metal layers for the RF, DC, and/or logic functions routed within thick film circuit 506. Thick film circuit 506 may have any suitable total thickness. In one embodiment, the thickness of thick film circuit 506 is approximately 5 mils.

The top layer of thick film circuit 506 is where electronic devices 508 are coupled thereto in any suitable manner. Any suitable electronic devices may be coupled to thick film circuit 506; however, in one embodiment, at least one of the electronic devices 508 is a MMIC that operates in the X-band frequency range. However, electronic devices 508 may be other suitable electronic devices that operate in other suitable frequency bands.

Seal ring 510, which may be formed from any suitable material, may be coupled to the perimeter or other suitable portion of the top dielectric layer in thick film circuit 506 in any suitable manner, such as brazing. And lid 512 may couple to seal ring 510 in any suitable manner, such as brazing or welding. Lid 512, in one embodiment, provides a hermetic cavity for transmit/receive module 500 in order to protect electronic devices 508 from the environment. Lid 512 may be formed from any suitable material and may have any suitable size and shape. In one embodiment, lid 512 is a bathtub type lid. In this embodiment, seal ring 510 may not be needed, in which case lid 512 coupled directly to the perimeter or other suitable portion of the top dielectric layer in thick film circuit 506.

Thus, in one embodiment, RF signals received by transmit/receive module 500 do not have to travel through vias in substrate 502 into the RF paths or traces formed in thick film circuit 506. The RF signals merely travel under seal ring 510 into the RF traces formed in thick film circuit 506, which still allows transmit/receive module 500 to obtain good RF impedance.

Although embodiments of the invention and some of their advantages are described in detail, a person skilled in the art could make various alterations, additions, and omissions without departing from the spirit and scope of the present invention as defined by the appended claims.

What is claimed is:

1. A transmit/receive module for a phased array radar, comprising:
   a substrate having no vias formed therein;
   a ground plane formed on the substrate having no vias formed therein;
   a thick film circuit including one or more dielectric layers formed outwardly from the ground plane, the one or more dielectric layers having RF and DC routing formed therein, the substrate having no signals to or from the RF and DC routing traveling therethrough; and
   an electronic device coupled outwardly from the one or more dielectric layers.

2. The transmit/receive module of claim 1, wherein the substrate is formed from a ceramic.

3. The transmit/receive module of claim 2, wherein the ceramic is beryllium oxide.

4. The transmit/receive module of claim 1, wherein the electronic device comprises a MMIC.

5. The transmit/receive module of claim 4, wherein the MMIC operates in an X-band frequency.

6. The transmit/receive module of claim 1, wherein the lid is welded to the seal ring.

7. The transmit/receive module of claim 1, wherein the lid is brazed to the seal ring.

8. A method of forming a transmit/receive module for a phased array radar, comprising:
   providing a substrate having no vias formed therein;
   forming a ground plane on the substrate having no vias formed therein;
   forming a thick film circuit including one or more dielectric layers outwardly from the ground plane, the one or more dielectric layers having RF and DC routing formed therein, the substrate having no signals to or from the RF and DC routing traveling therethrough; and
   coupling an electronic device outwardly from the one or more dielectric layers.

9. The method of claim 8, wherein the substrate is formed from a ceramic.

10. The method of claim 9, wherein the ceramic is beryllium oxide.

11. The method of claim 8, wherein the electronic device comprises a MMIC.

12. The method of claim 11, wherein the MMIC operates in an X-band frequency.

13. The method of claim 8, wherein coupling the lid to the seal ring comprises welding the lid to the seal ring.

14. The method of claim 8, wherein coupling the lid to the seal ring comprises brazing the lid to the seal ring.

15. A transmit/receive module for a phased array radar, comprising:
    a ceramic substrate having no vias formed therein;
    a ground plane formed on the ceramic substrate having no vias formed therein;
    a thick film circuit including one or more dielectric layers formed outwardly from the ground plane, the one or more dielectric layers having RF and DC routing formed therein, the substrate having no signals to or from the RE and DC routing traveling therethrough;
    a MMIC coupled outwardly from the one or more dielectric layers;
    a seal ring brazed to a portion of the one or more dielectric layers; and
    a lid coupled to the seal ring.

16. The transmit/receive module of claim 15, wherein the ceramic substrate is formed from beryllium oxide.

17. The transmit/receive module of claim 15, wherein the MMIC operates in an X-band frequency.

18. The transmit/receive module of claim 15, wherein the lid is brazed or welded to the seal ring.

19. The transmit/receive module of claim 1, further comprising a lid coupled to a portion of the one or more dielectric layers.

20. The method of claim 8, further comprising coupling a lid to a portion of the one or more dielectric layers.

* * * * *